No. 656,549. Patented Aug. 21, 1900.
H. C. KENNEDY.
CLUTCH MECHANISM.
(Application filed June 26, 1899.)
(No Model.)
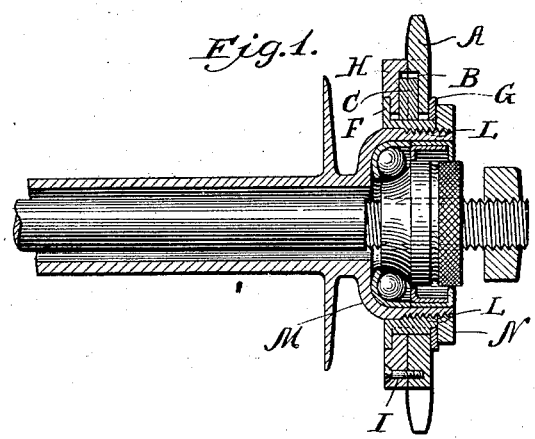
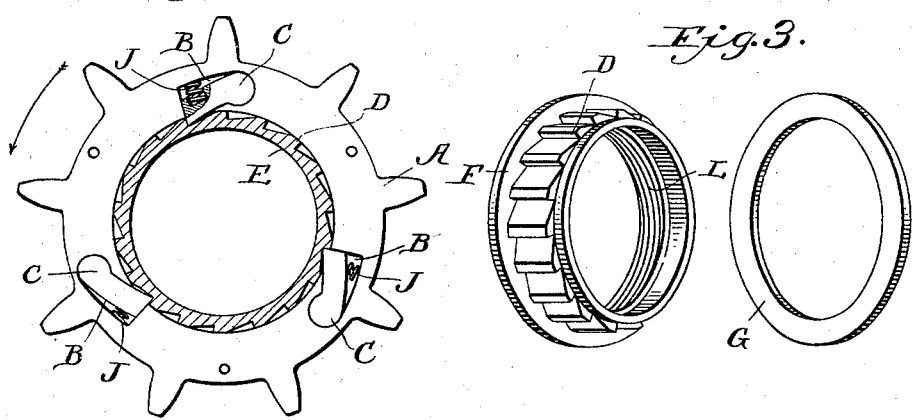
Witnesses
E. C. Wurdeman
J. J. Williamson
Inventor
Henrique C. Kennedy
by Geo. H. Lytton Jr.
Atty

UNITED STATES PATENT OFFICE.

HENRIQUE C. KENNEDY, OF PHILADELPHIA, PENNSYLVANIA.

CLUTCH MECHANISM.

SPECIFICATION forming part of Letters Patent No. 656,549, dated August 21, 1900.

Application filed June 26, 1899. Serial No. 721,985. (No model.)

*To all whom it may concern:*

Be it known that I, HENRIQUE C. KENNEDY, a citizen of the United States, residing at Philadelphia, in the county of Philadelphia and State of Pennsylvania, have invented a certain new and useful Improvement in Driving Mechanism for Bicycles and the Like, of which the following is a specification.

My invention relates to a new and useful improvement in ratchets and pawls for the driving-hubs of a bicycle or the like, and has for its object to provide a simple device of this description which will provide for the running of the drive-wheel independent of the sprocket in one direction, while giving said sprocket a positive hold upon the hub in the opposite direction, so as to transmit power from the driving mechanism, such as the pedals, to the drive-wheel.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a longitudinal section of the rear hub of a bicycle, showing my improvement applied thereto; Fig. 2, a rear elevation of the sprocket-wheel, the flange of the ratchet-collar being sectioned away so as to show the pawls, one of said pawls also being partially sectioned away to show the arrangement of the spring for holding it in engagement, and Fig. 3 a detailed perspective of the ratchet-collar and ring.

In carrying out my invention as here embodied A represents the sprocket-wheel over which the drive-chain runs for imparting motion to the rear wheel, and this sprocket has the recesses B formed therein for the reception of the pawls C, here shown as three in number. These pawls engage with the teeth of the ratchet D, which is formed upon the collar E, the latter being adapted to be secured upon the drive-hub. The collar E has formed therewith a flange F, and a ring G is fitted upon its opposite end, and these flanges all embrace this sprocket-wheel and the faceplate H, the latter being secured to the sprocket-wheel by means of the screws I for the purpose of housing and preventing the displacement of the pawls. Each of the pawls is actuated in one direction by a spring J, which holds them in engagement with the teeth of the ratchet, and it is to be noted that any movement of the sprocket while in the direction of the arrow will cause the collar to move in the same direction by the combined engagement of the three pawls with said teeth. This insures a positive hold upon the ratchet and distributes the strain in such manner as to prevent undue wear and tear on the driving mechanism. The ratchet-collar E is internally threaded, as indicated at L, and is therefore adapted to be secured upon the hub M, which is also threaded for that purpose. A nut N is run upon the outer end of the threaded portion of the hub and acts as a jam-nut to secure the collar in place, and this, as is obvious, will cause the collar and parts carried thereby to revolve with the hub.

My improvement is especially adapted for use in connection with bicycles and is utilized as what is termed a "stop motion"—that is to say, the rider may stop the motion of the pedals and yet the machine will continue its forward progression, and when running down-grade this permits coasting without the necessity of following the movements of the drive-wheel with the feet.

I am aware that various devices have been contrived for bringing about this result, and I do not wish to be understood as broadly laying claim to a stop motion.

It will be observed that the face-plate is recessed upon its inner face opposite the recesses in the sprocket-wheel and that it is rabbeted to receive the flange of the collar, so that when in place it forms a practically dust-tight connection.

What I claim as new and useful is—

The combination with the hub having exterior threads, of the collar having a flange, an annular ratchet and an annular unthreaded portion beyond the ratchet and interior threads to engage the threads of the hub, a ring fitted over said annular portion and bearing against the outer face of the ratchet, a sprocket-wheel having recesses in its inner face, spring-actuated pawls in said recesses to engage the ratchet, and a face-plate recessed upon one face opposite the recesses of the sprocket-wheel and on its other face provided with a rabbet, said face-plate being arranged over the recesses in the sprocket-wheel, said face-plate and sprocket-wheel being confined between the flange of the collar and said ring and fixedly secured together, and a jam-nut engaging the threads of the hub and bearing against said collar and ring, all substantially as shown and described.

In testimony whereof I have hereunto affixed my signature in the presence of two subscribing witnesses.

HENRIQUE C. KENNEDY.

Witnesses:
ISABEL MACQUEEN,
WM. G. GLENN.